Figure 1:
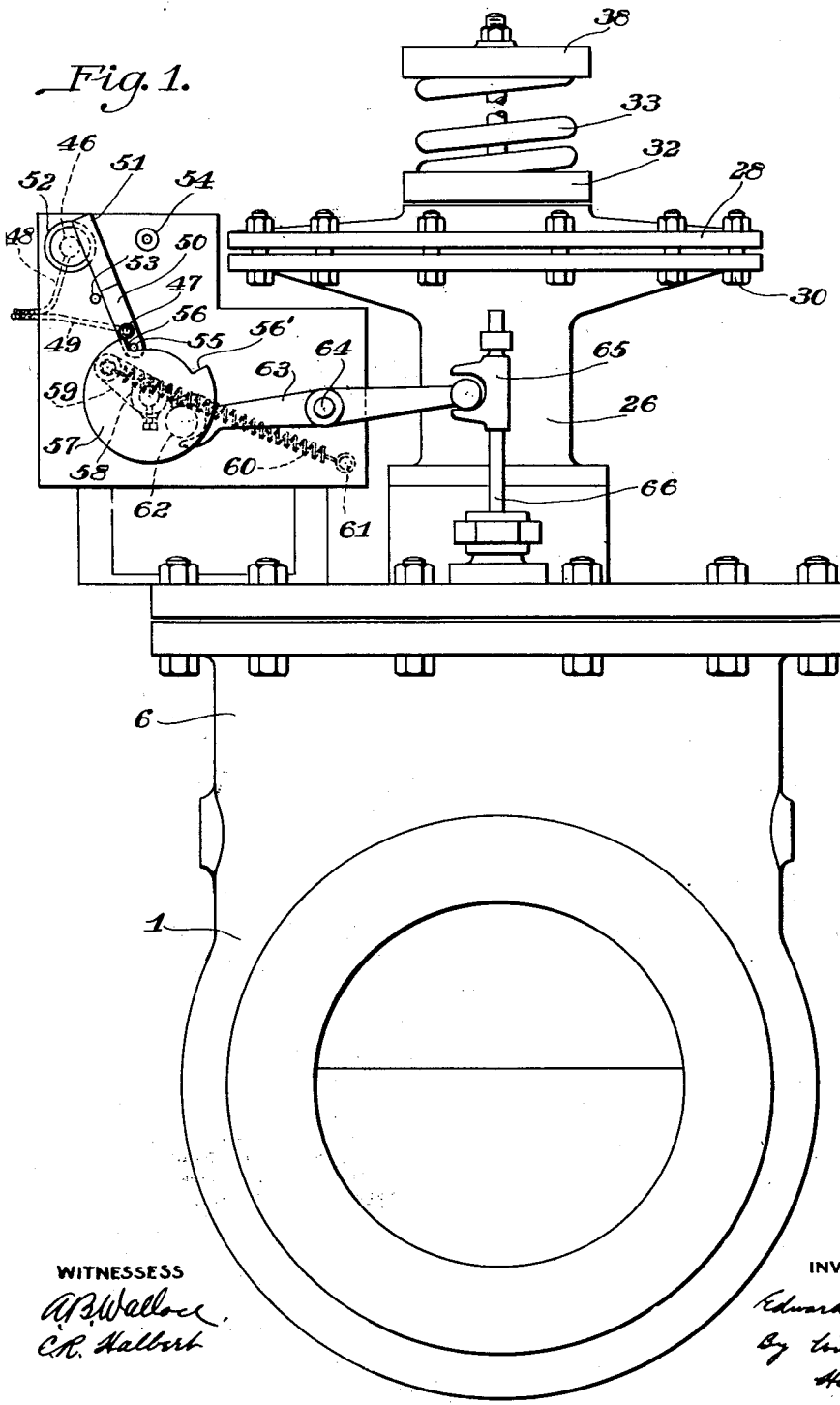

July 21, 1925. 1,546,356
E. V. ANDERSON
CONTROL VALVE
Filed Feb. 25, 1924 4 Sheets-Sheet 2

WITNESSES
INVENTOR
Edward V. Anderson
By Winter & Brown
his attys

July 21, 1925.

E. V. ANDERSON 1,546,356

CONTROL VALVE

Filed Feb. 25, 1924

4 Sheets-Sheet 3

WITNESSES

INVENTOR
Edward V. Anderson

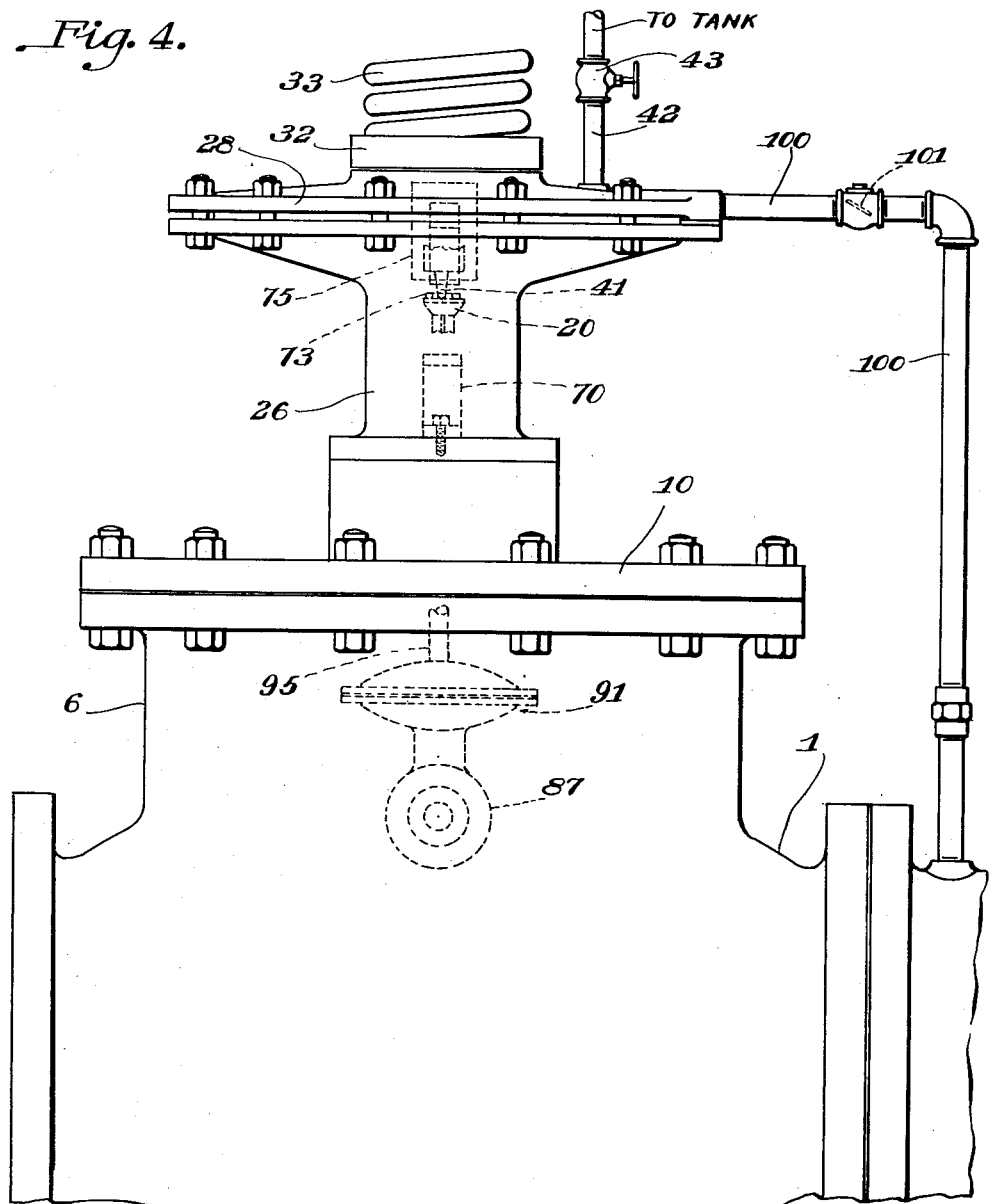

Patented July 21, 1925.

1,546,356

UNITED STATES PATENT OFFICE.

EDWARD V. ANDERSON, OF MONESSEN, PENNSYLVANIA, ASSIGNOR OF ONE-HALF TO CHARLES E. GOLDEN, OF CRAFTON, PENNSYLVANIA.

CONTROL VALVE.

Application filed February 25, 1924. Serial No. 695,057.

*To all whom it may concern:*

Be it known that I, EDWARD V. ANDERSON, a citizen of the United States, and a resident of Monessen, in the county of Westmoreland and State of Pennsylvania, have invented a new and useful Improvement in Control Valves, of which the following is a specification.

This invention relates to valves and control means therefor, and particularly to multiple control valves for maintaining a uniform stage of water in tanks and the like, equipped with a pilot valve for automatically governing the main valve in accordance with the conditions of the water in the tank or supply conduits.

It is a special object to provide an improved valve mechanism in which the actuating fluid for moving the main valve upon release to permit the opening thereof, or upon leakage past the parts directly associated with the pilot valve, will not be permitted to escape to the exterior of the casing and drip over the exposed parts of the casing.

It is also a special object to provide a simpler, more easily adjusted, and more efficient pilot valve construction for multiple valves of this character than has heretofore been available, in which the wall of the hollow stem of the pilot valve employed is left intact and free of lateral ports throughout its entire extent, in which the packing and sealing means for said hollow stem may be applied and removed without disturbing the seating of the auxiliary valve for governing passage of fluid through the hollow stem, or producing binding of the several associated parts of the pilot valve.

It is a further special object to provide a motor controlling means associated with the valve mechanism in such a manner as to be actuated directly in response to the movements and by contact of the main valve, which is positive in action while at the same time extremely flexible, and one which is not affected by slight movements in either direction of the main valve but immediately responsive after said valve has moved a predetermined extent either in opening or in closing.

A still further object is to provide a novel means associated with the pilot valve for positively closing the main valve manually from a distance and regardless of the condition of the water in the tank.

Another special object is to provide means controlled by pressure at the inlet side of the main valve which upon abnormal lowering of the said pressure below a predetermined amount due to either an exceptional decrease of pressure in the supply line, shutting down of the pumps forcing the water through the main valve casing, back flow through the valves in the supply conduit or in the pumps or for any other reason, tank pressure will be directly applied to the parts connected to the main valve for forcing it to its open position.

And in addition, it is a special object to so associate the valve mechanism with the supply conduit and the storage tank that the water in the tank may be entirely withdrawn backwardly through the supply conduit, if desired, in spite of the position of the main valve, whenever the pressure on the inlet side becomes less than that on the outlet side of the main valve.

Figure 2:
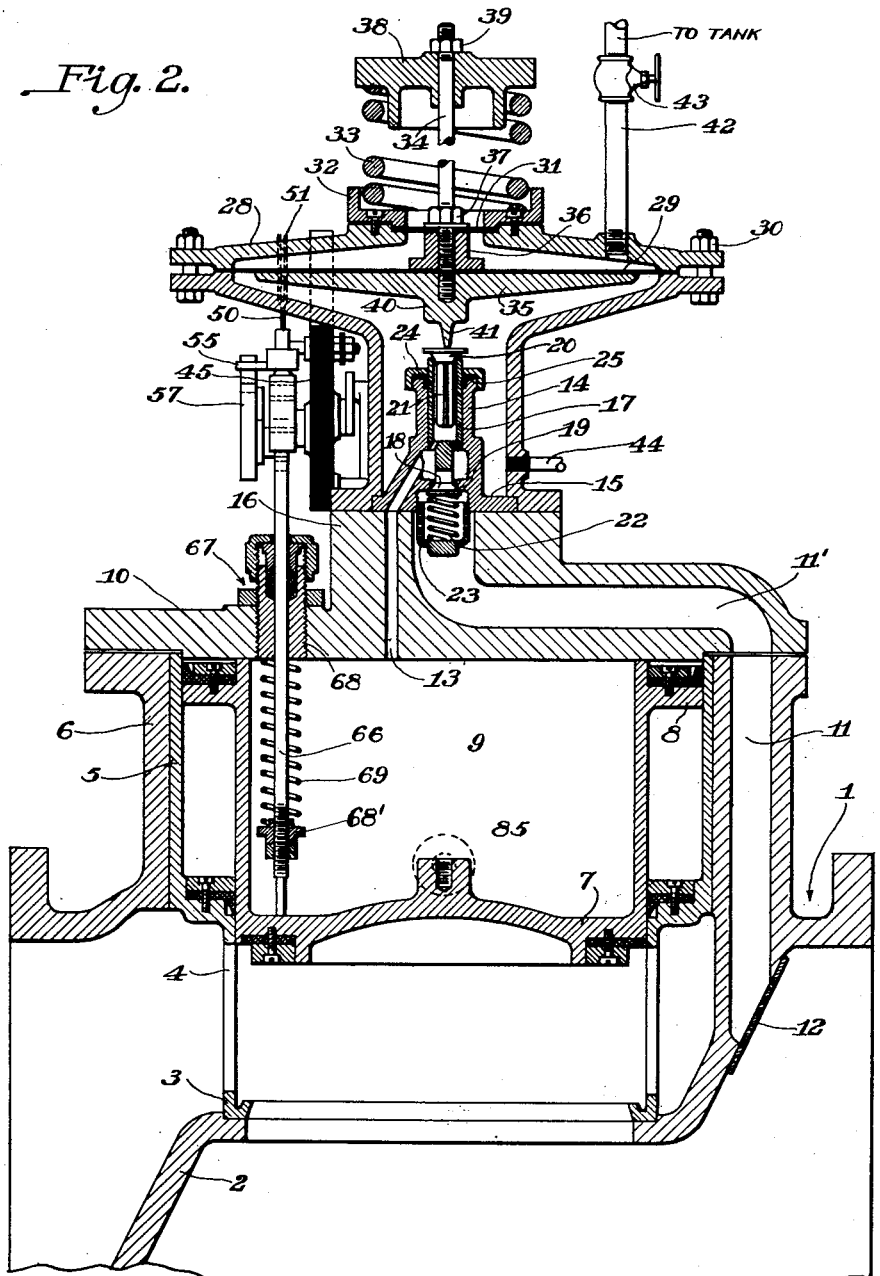
Figure 3:
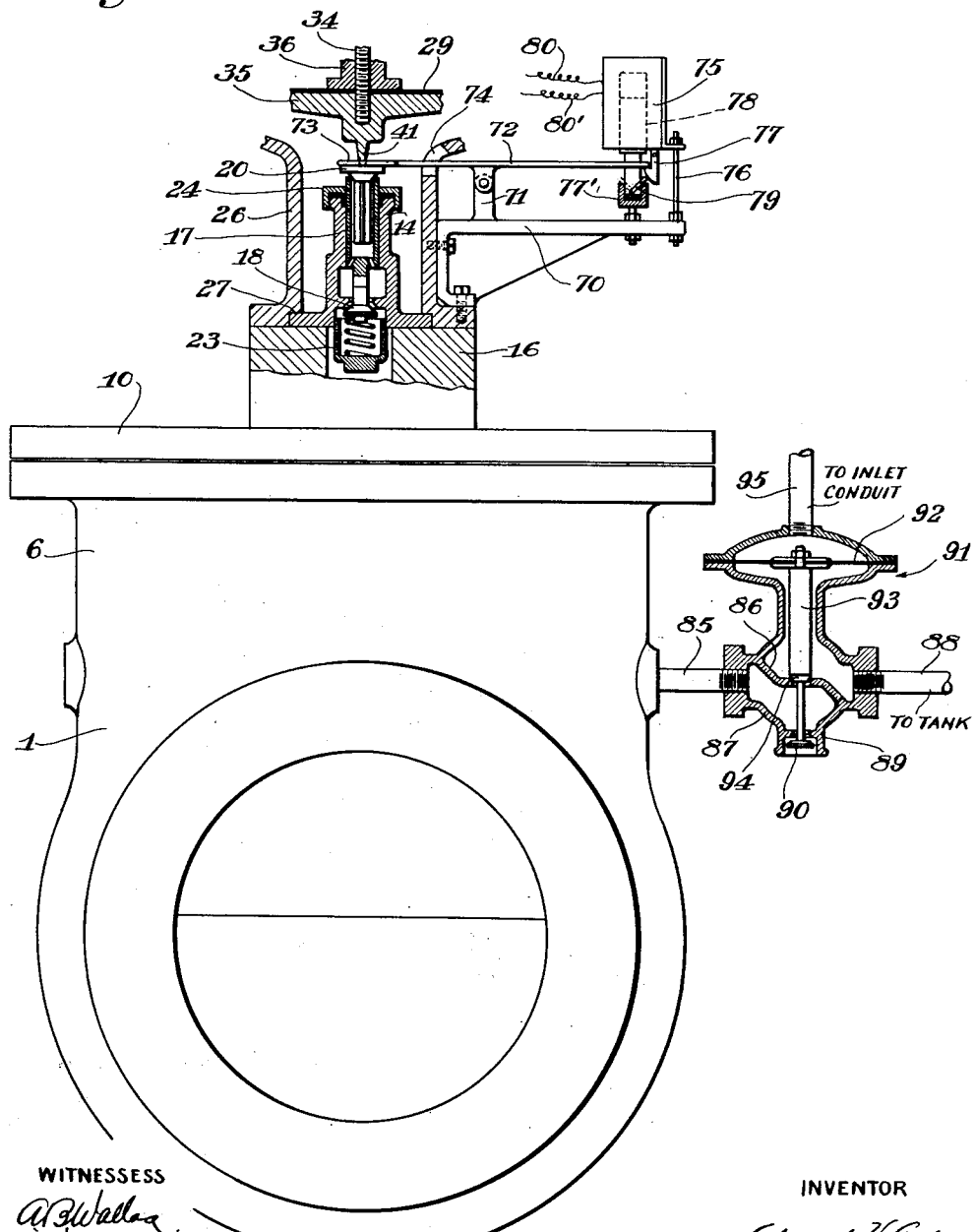

In the accompanying drawings, Fig. 1 is an elevation of one embodiment of the invention, showing the method of mounting the motor control switch mechanism; Fig. 2 a vertical sectional view, with parts in elevation, showing the internal construction and arrangement of the valve mechanism illustrated in Fig. 1; Fig. 3 a fragmentary view, partly in section and partly in elevation, showing the electromagnetic means for manually operating the valve from a distance, and the means for utilizing the water in the tank for opening the main valve; and Fig. 4 an elevational view showing the improved valve with the connections to the tank and supply conduit permitting the withdrawal of the water in the tank backwardly through the supply conduit.

The main valve casing is indicated at 1, being provided with the usual perforated partition 2, carrying a valve seat 3, located at the bottom of a cylindrical liner 4, which latter is preferably made integral with another larger liner 5 in the cylindrical hood or extension 6 of the valve casing. The valve 7 is in cylindrical form, and is provided at the top with a piston 8 operating in the larger portion 5 of the liner. The piston forms a dash pot for both opening and closing movement, and is operated to close the main valve 7 by manipulation of the pressure within the chamber 9 behind it. The open end of the cylindrical extension 6 is surmounted by a cover plate 10 forming the top of the main valve casing.

For the purpose of manipulating the pressure behind the piston in chamber 9, I provide in the casing a passage 11, the inlet of which is covered by the screen 12, leading from the high pressure side of the valve, which intermittently communicates with the chamber 9 above the valve piston 8 by means of the duct 13 and the pilot valve, the passage 11 being formed in part within the wall of the cylindrical extension 6 and partly, as indicated at 11′, within the top plate 10.

The pilot valve includes a guide casing 14 having the flange base 15 seating directly upon an upwardly extending boss 16 forming an integral part of the top plate 10. Mounted for reciprocating sliding movement within the upper portion of the casing 14 is the hollow open ended stem 17 of an auxiliary valve 18, the valve head being formed integrally with the hollow stem and adapted to cooperate with a valve seat 19 formed upon a suitable web within the casing. The hollow stem 17 is left substantially intact throughout its entire extent, being free of lateral ports extending therethrough, and is provided at its open end with a valve seat, with which cooperates the head of a second auxiliary valve 20 equipped with a plurality of radially extending wings 21 serving to properly position the valve within the hollow stem. The auxiliary valve 18 is normally urged to its seat by means of a coiled compression spring 22 housed within a perforated screen cap 23 threadedly engaged with the opening in the guiding casing immediately below the valve. A sealing ring 24 is attached to the upper extremity of the guiding casing 14 for the purpose of retaining a suitable packing 25, both the packing and the ring surrounding the upper end of the hollow stem.

The lower section 26 of the casing for the pressure responsive device for controlling the pilot valve is recessed as indicated at 27, and rests directly upon the flanged base 22 of the guiding casing 14 as well as upon the upper surface of the boss 16, thereby not only positioning the pilot valve casing but making an effective seal at this point. The casing section 26 is flared outwardly towards its upper part and cooperates with an upper section 28 to form a diaphragm chamber, the diaphragm 29 being interposed between the sections of the casing whereby to be gripped therebetween around its entire margin in a well known manner, the sections being forcibly held together by means of a series of suitably spaced bolts 30.

The central portion of the casing section 28 is provided with an opening which is closed by the sealing diaphragm 31 which is gripped around its peripheral edge between the section 28 and a seating ring 32 serving as a support for the lower end of a helical spring 33. Rod or stem 34 is attached to both of the diaphragms 29 and 31, the diaphragm 29 being interposed between a backing disk 35 and a flanged nut 36, while the diaphragm 31 lies between the nut 36 and a locking nut 37, the lower end of the stem 34 being threaded for attachment to all of these parts. The upper end of the stem has attached thereto a spring seat 38 which is contacted by the upper extremity of the spring 33, and in order to vary the tension of the spring the seat 38 may be vertically adjusted to various positions by means of the nut 39.

The backing disk 35 is of substantial size and is equipped at its central portion with a depending boss 40 terminating in a finger 41 adapted to contact and normally rest directly upon the head 20 of one of the auxiliary valves of the pilot valve mechanism, the stem 34, the finger 41, as well as both of the auxiliary valves of the pilot valve mechanism, being preferably arranged in alignment with each other.

Pressure is admitted to the diaphragm casing within the space above the diaphragm 29 by means of a pipe 42 which communicates with the tank in which the water is stored, this pipe being equipped with a cutoff valve 43. For the purpose of discharging the pressure fluid which is released by the pilot valve from the chamber 9, the lower section 26 is provided with a drain pipe 44 opening into the space surrounding the pilot valve adjacent the bottom thereof.

The water forced through the main valve casing 1 may be obtained from any available source, and may be caused to flow through the valve either under its own head or forced therethrough by means of suitable pumps actuated by motors. In the event that it is desirable to employ motor driven pumps to furnish the supply of water, suitable mechanism must be used in order to control the operation of the pumps in accordance with the condition of the water in the receiving tank. Electric motors are preferably used for actuating the pumps and the control means therefor may be constructed as follows: A suitable supporting plate 45 of insulating material is fixed at one side of the casing. This plate carries a pair of terminals 46 and 47 to which the conductors 48 and 49, respectively, are connected. The terminal 47 forms a pivotal support for the switch arm 50 having a bifurcated extremity 51 which cooperates with a disk like element 52 forming a part of the terminal 46. Mounted at suitable points upon the plate relative to the switch arm are a pair of limiting stops 53 and 54 for preventing undue movement of the arm 50 when swung into either its closed or open position. The lower end of the switch arm 50 carries a lug 55 which projects outwardly and cooperates with a pair of spaced shoulders 56, 56' formed by cutting away a portion of the periphery of a disk 57 which is mounted for rotative movement upon a stub shaft 58 journalled in the plate 45. The shaft 58 has attached thereto a crank arm 59 the outer end of which has connected thereto one end of a coil spring 60 while its opposite end is anchored as at 61 to the supporting plate. The disk 57 also carries a lug 62 which is adapted to be engaged by the bifurcated end of a lever 63 pivoted as at 64 upon the plate 45. The opposite end of lever 63 engages a recessed lug 65 fixed to the upper end of an actuating rod or stem 66 which extends through the top plate 10 and terminates within the interior of the chamber 9.

The rod 66 is mounted for vertical sliding movement through the plate 10 by means of a combined guide plug and stuffing box indicated generally at 67, the guide plug being anchored in a threaded opening 68 provided in the plate 10. The lower extremity of the rod 66 carries an abutment in the form of a nut 68' serving as a seating member for one end of a coil spring 69 surrounding the rod 66 with its upper extremity in abutting relation with the plug 67. Both the size of the abutment 68' and spring 69 are such, relatively to the plug 67, that the entire switch operating control means can be removed by unthreading the guide plug from the top plate 10.

The operation of the valve, thus far described, is as follows: The water is supplied through the conduit in which the main valve casing is interposed and delivered to a suitable storage tank or reservoir, the pressure therein being communicated above the diaphragm 29 by means of the pipe connection 42, and as previously pointed out this water may either flow to the tank or reservoir under its own head or under the influence of suitable pumps. When ever the pressure in the tank or reservoir is insufficient to compress the spring 33 to cause the finger 41 to hold the auxiliary valve 20 tightly upon its seat, the said auxiliary valve is free to open, at which time the pressure of the water in the main conduit below the valve 7 will force the main valve upwardly, the fluid above the main valve and piston 8 escaping through the duct 13, the hollow stem 17, and the valve 20 into the space surrounding the pilot valve casing from which it escapes through the drain pipe 44.

As soon as the pressure within the storage tank or reservoir reaches a pressure sufficiently great to move the diaphragm 29 to compress the spring 33 sufficiently to cause the finger 41 to seat the valve 20 and depress the hollow stem 17 with its attached auxiliary valve 18, pressure fluid is permitted to flow through the passage 11—11', the auxiliary valve 18, and the duct 13 to fill the chamber 9 and move the main valve to its closed condition, preventing further fluid being supplied to the storage tank or reservoir.

It is noted that in the operation of the pilot valve in order to close the main valve 7, the auxiliary valve 20 is first tightly seated, followed by opening of the auxiliary valve 18, while in the actuation of the pilot valve to permit release of the fluid from the chamber 9, the auxiliary valve 18 is first seated followed by release of pressure upon valve 20 allowing it to rise.

The fluid escaping from chamber 9 through the valve 20, instead of being directly discharged to the drain opening is collected within the annular space between the pilot valve casing and the casing section 26 and subsequently drawn off through the drain pipe. This is also true of any fluid leaking past the hollow stem 17. Due to the mounting of the several parts, and the effective seal provided by the mounting of the section 26 upon the flanged portion of the pilot valve casing, all of the actuating fluid is finally discharged through the pipe 44 without any leakage or dripping upon exposed parts of the valve casings. This feature is of great practical commercial importance and considerable difficulty has been experienced in this connection with many of the multiple control valves now upon the market.

The pressure at which the valve will respond due to changes of condition within the storage tank or reservoir may be adjusted by means of varying the tension of the spring 33, and due to the method of mounting this spring, the desired adjustments may be effected by merely changing the position of the plate 38 by means of the nut 39.

When the fluid is supplied by means of pumps, it is understood that the actuation of the pumps is stopped when a predetermined high pressure is reached in the storage tank or reservoir at the time the main valve 7 is closed, and that the actuation of the pumps is again started upon the opening of the main valve.

With the motor control mechanism shown in the drawings, opening of the valve 7 will cause the upper face of the valve to directly contact the lower extremity of the rod 66 and raise the same against the tension of spring 69. Upward movement of rod 66 rocks the lever 63, and in turn oscillates the disk 57. Likewise, during the closing movement of valve 7 the spring 69 will move the rod 66 downwardly. The several parts are illustrated in Fig. 1 of the drawings in the relative positions which they assume when the main valve 7 is open with the switch arm 50 in its closed condition completing the circuit to the motors for operating the pumps. Assuming the main valve 7 to be moved to its closed condition, in the manner previously described, lowering of the rod 66 will rock the lever 63 and rotate the disk 57 in an anti-clockwise direction, as viewed in Fig. 1. When the disk has been sufficiently moved to bring the points of connection for the ends of the spring 60 below the axis of the disk, the spring 60 will quickly move the shoulder 56 out of contact with the lug 55 and forcibly bring the shoulder 56' into contact with the said lug, whereby the switch lever 50 will be snapped from its closed condition into its opened condition in which the arm 50 will contact the stop 54 instead of the stop 53. Opening of the switch in this manner will stop the motors associated with the pumps.

Likewise, upon opening movement of the valve 7, the parts will be operated in a reverse sense until the shoulder 56 rocks the arm 50 from its open to its closed condition in an obvious fashion.

Due to the fact that the main valve actuates the motor control means by directly contacting the actuating rod 66, an extremely positive functioning is secured while at the same time securing a high degree of flexibility. It is noted that association of the motor control means in this manner provides a construction in which the switch element will be moved in response to the main valve having a substantial movement or path of travel, which feature is extremely difficult to obtain without the employment of complicated mechanism when the motor control is actuated from a moving part having but a limited travel. This difficulty frequently arises in designing actuating means operated in response to movement of the pilot valve mechanism. It is also particularly pointed out that due to the degree of movement necessary by the main valve in order to shift the switch arm, the motor control means is entirely unresponsive to slight variations in the position of the main valve, but will be immediately responsive thereto upon a positive movement of the main valve either to closed or open positions.

Decided advantages are secured by the improved form of pilot valve construction employed, not only in respect to the prevention of leakage of fluid over the exposed portions of the valve casings, but a very sturdy and rigid structure is obtained by entirely eliminating lateral ports extending through the body of the hollow portion of the stem 17, thereby avoiding all danger of distortion of the valve stem, and permitting the application and removal of the sealing ring 24 and its packing 25 without causing distortion or undue binding of the pilot valve parts.

In an installation involving a valve mechanism of this character, it frequently becomes desirable to be able to close the main valve 7, irrespective of its pressure control devices and irrespective of the condition of the fluid in the storage tank or reservoir. And it is highly desirable to provide a manual control which though effective when needed, will not affect the normal operation and functioning of the valve mechanism. In Fig. 3 of the drawings, I have illustrated an improved form of manual control which is magnetically operated. A supporting bracket 70 is secured at one side of the casing section 26. Pivotally mounted on an upstanding lug 71 on the bracket is a lever 72 having an inner bifurcated extremity 73 of which extends through an aperture 74 at one side of the casing and lies directly over the auxiliary valve 20 so as to contact the head of the valve. The limbs of the bifurcations, however, lie at the opposite sides of the finger 41 so as not to interfere with the movements of the pilot valve due to variation in the position of the diaphragm 29. A solenoid 75 is supported by means of a rod 76 extending upwardly from the end of the bracket 70 while a guide cup 77' is likewise supported from the bracket. Pivotally supported at an appropriate point and depending from the solenoid is a catch 77, the catch being preferably disposed in alignment with the lever 72 so as to engage the outer end of the lever after it has been elevated. The lower extremity of the core 78 of the solenoid is freely threaded through an aperture in the outer end of the lever 72 and carries a pivoted finger 79 at its lower extremity. This finger is mounted within a recess in the body of the core and is adapted to freely swing from side to side, the tip of the finger extending a distance beyond the core. The core 78 slidably fits within the guide cup 77', and the relative positions of the parts are such that the finger 79 will strike the upper edge of the cup during each downward movement of the core whereby to deflect the finger from its position at one side of the cup to a position diametrically opposite thereto upon each descent of the core, in an obvious fashion. Current is supplied to the solenoid by means of the conductors 80, 80'.

The manual control mechanism just described operates as follows: At any time it is desirable to close the main valve 7 it is merely necessary to complete the circuit to the solenoid 75 so as to raise the lever 72 and cause it to be engaged and held in elevated position by means of the pivoted catch 77. When the lever has been raised to its elevated position, the bifurcated extremity 73 forces the auxiliary valve 20 closed and the auxiliary valve 18 open, whereby to permit pressure fluid to enter the chamber 9 and force the main valve 7 to its seat. As long as the lever 72 is locked in its elevated position, the main valve will remain closed. In order to release the lever, the solenoid is energized to cause upward movement of the core to bring the pivoted finger 79 into contact with the nose of the catch 77, forcing it to the right, as viewed in Fig. 3, thereby releasing the outer end of the lever 72 and restoring the valve mechanism to its normal condition under the influence of the controlling diaphragm 29. It is obvious that upward movement of the core will either release the catch 77 or elevate the lever 72 depending upon the side of the core at which the finger 79 projects, that upon each downward movement of the core the finger will be swung to the opposite side of the guide cup due to impact with its upper marginal edge, and in this way it is merely necessary to successively energize and de-energize the solenoid in order to lock the lever 72 in its elevated position or to release the same, as desired.

It has been found that under some conditions the water at the inlet side of the valve 7 will leak backwardly through the supply lines thereby either entirely removing or decreasing the pressure below the valve 7 normally effective in forcing it to its open condition. In this event, the release of pressure above auxiliary valve 20 will not be effective in moving the main valve from its closed to its open position. It has therefore been found advisable to employ an auxiliary valve mechanism for admitting pressure fluid into the annular space below the piston 8 in order to move it from its closed to open position, or to assist the decreased pressure existing below the main valve for such purpose. This auxiliary valve mechanism is illustrated in detail in Fig. 3 of the drawings. The annular space below the piston of the valve is connected by means of a pipe 85 to one side of the partition 86 of a valve casing 87, the opposite side of the partition being placed by means of the pipe 88 into communication with the storage tank or reservoir. The casing 87 below the diaphragm 86 is provided with a depending neck 89 equipped with a valve seat with which the valve head 90 cooperates, while the upper portion of the casing in communication with the pipe 88 is enlarged to form one-half of a diaphragm chamber 91. A diaphragm 92 is mounted in this chamber and is attached to the upper end of a stem 93 carrying at its lower extremity the valve head 90, and having its intermediate portion equipped with a valve face 94 adapted to cooperate with a valve seat in the partition 86. The space above the diaphragm 92 is placed in communication by means of the pipe 95 with the supply conduit at the inlet side of the main valve casing 1. The valve head 90 and the valve face 94 are spaced apart so that but one of them cooperates with its seat at any one time, in other words, when the valve head 90 is unseated, the valve face 94 may seat and vice versa.

In operation, as long as a sufficient pressure is maintained in the inlet conduit of the main valve, diaphragm 92 will be forced downwardly so as to close valve 94 but maintain the valve 90 open, as shown in Fig. 3. With the parts in this position, the annular space below the piston 8 is placed in communication with the atmosphere and the fluid from the tank is prevented from passing the valve 94. However, should the supply of fluid fail at the inlet side of the main valve, or the pressure therein become materially reduced, the diaphragm 92 will be moved upwardly seating the valve 90 and unseating the valve 94. This cuts off communication to the atmosphere through the valve 90 and permits pressure fluid to be admitted from the pipe 88 to the space below the piston 8 thereby forcibly moving the main valve to its open condition or assisting the decreased pressure below the valve 7 in effecting this result.

It has also been found desirable under certain conditions in installations in which multiple valves are employed to provide means permitting all of the stored fluid to be withdrawn backwardly through the inlet supply line of the main valve. The structure shown and described readily lends itself to a simple provision for allowing the stored water to run back for distribution through the main, if desired, whenever the pressure on the inlet side becomes less than that on the outlet side of the main valve. Thus, in Fig. 4, the diaphragm chamber above the diaphragm 29 is connected by a pipe 100, containing a downwardly opening check valve 101, to the inlet conduit leading to the inlet side of the main valve casing 1. Thus the operation of the pilot valve and ordinary pressure control, will continue so long as the pressure at the inlet side of the main valve casing is greater than the pressure in the tank to which the pipe 42 is connected. But if, as in the case of fire or other abnormal conditions, the supply line pressure should drop, the check valve 101 will be forced open by the superior pressure in the storage tank and in the pipe 42, and, since the effective opening in the pipe 100 is larger than in the pipe 42, either due to the relative dimensions of the pipes or to the adjustment of the cut-off valve 43, the water may not only run back from the storage into the supply pipe, but the effective opening being larger in pipe 100 will render it impossible for the pressure to accumulate above the diaphragm 29 so as to depress the pilot valve and close the main valve 7, as heretofore described in connection with the operation of the main valve and pilot valve.

It is thus seen that the invention provides a multiple valve and control means therefor which will effectively maintain a uniform stage in storage tanks or reservoirs, and at the same time permit special operations thereof to accommodate the same to abnormal or special conditions existing in the system in which the valves are employed, one in which the pilot valve associated with the main valve is so constructed and connected therewith as to prevent leakage of the actuating fluid from the main valve upon the exterior portions of the casing and obviating breakage or binding of the pilot valve parts so frequently experienced with valves heretofore in use, and a construction which while positive and effective in operation possesses great flexibility.

I claim:

1. The combination with a main valve having a movable element provided with a piston, of a pilot valve adapted to open the main valve by releasing pressure behind the piston, said pilot valve comprising a guiding casing, an auxiliary valve having an open ended hollow stem mounted for sliding movement in said casing, the open end of the stem being equipped with a valve seat, a second auxiliary valve seating thereon, and a pressure control device for automatically operating the pilot valve.

2. The combination with a main valve having a movable element provided with a piston, of a pilot valve adapted to open the main valve by releasing pressure behind the piston, said pilot valve comprising a guiding casing, an auxiliary valve having an open ended hollow stem mounted for sliding movement in said casing, the open end of the stem being equipped with a valve seat, a second auxiliary valve seating thereon, and a pressure control device for automatically operating the pilot valve, the casing of the pressure control device surrounding the guiding casing for the pilot valve.

3. The combination with a main valve having a movable element provided with a piston, of a pilot valve adapted to open the main valve by releasing pressure behind the piston, said pilot valve comprising a guiding casing equipped with a flanged base, an auxiliary valve having an open ended hollow stem mounted for sliding movement in said casing, the open end of the stem being equipped with a valve seat, a second auxiliary valve seating thereon, and a pressure control device for automatically operating the pilot valve, the base of the casing of the pressure control device seating upon the flanged base of the guiding casing and the side walls thereof being spaced from the guiding casing whereby to surround the same.

4. The combination of a casing, a main valve mounted in the casing for governing the flow of fluid therethrough, a motor control means mounted upon the exterior of the casing, an actuating rod operatively connected with the said means, said rod passing through the casing and terminating within the interior thereof, the said rod being positioned in the path of movement of the valve whereby to be directly contacted thereby.

5. The combination of a casing, a main valve mounted in the casing for governing the flow of fluid therethrough, a motor control means mounted upon the exterior of the casing, an actuating rod operatively connected with the said means, the said rod being mounted for sliding movement in and extending through the top of the casing within the interior thereof, the end of the rod being disposed in the path of travel of the valve whereby to be directly contacted thereby during opening of the valve, and tension means associated with the rod to urge the same towards the valve.

6. The combination of a casing, a main valve mounted in the casing for governing the flow of fluid therethrough, a motor control means mounted upon the exterior of the casing, a combined guide plug and stuffing box removably anchored in the top of the casing, an actuating rod slidably mounted in the guide plug and having its lower extremity terminating within the interior of the casing and disposed in the path of travel of the valve whereby to be contacted thereby during opening movement of the valve, an abutment on the rod, and a spring interposed between the plug and abutment, the dimensions of the abutment and spring relative to the plug being such as to permit withdrawal of the parts outwardly through the opening in which the plug is anchored.

7. The combination with a main valve having a movable element provided with a piston, of a pilot valve to permit opening of the main valve by releasing pressure at one side of the piston, a pressure control device for automatically operating the pilot valve, an auxiliary pressure control device normally maintaining the opposite side of the piston in communication with the atmosphere, said auxiliary pressure control device being responsive to the pressure at the inlet side of the main valve to introduce a high pressure actuating fluid to the said opposite side upon a lowering of the inlet pressure below a predetermined point whereby to open the main valve.

8. The combination with a main valve having a movable element provided with a piston, of a pilot valve to permit opening of the main valve by releasing pressure at one side of the piston, a pressure control device provided with a movable abutment subjected on opposite sides to the pressures at the inlet and outlet sides of the main valve, respectively, a valve normally maintaining the opposite side of the piston in communication with the atmosphere and cut off from the pressure in the outlet side of the main valve, said auxiliary pressure device upon an abnormal lowering of the pressure at the inlet side of the main valve cutting off said communication with the atmosphere and permitting inflow of pressure fluid whereby to open the main valve.

9. The combination with a main valve having a movable element provided with a piston, of a pilot valve to permit opening of the main valve by releasing pressure at one side of the piston, a pressure control device for automatically operating the pilot valve, and means for manually actuating the pilot valve independently of the pressure control device comprising a pivoted lever, one end of the lever adapted to contact the pilot valve, the opposite end of the lever having threaded therethrough the core of a solenoid, a catch for locking the lever whereby to maintain the pilot valve in a position to close the main valve, and means on the said core to alternately release and lock the said lever.

10. The combination with a main valve having a movable element provided with a piston, of a pilot valve to permit opening of the main valve by releasing pressure at one side of the piston, a pressure control device for automatically operating the pilot valve, and means for manually actuating the pilot valve independently of the pressure control device comprising a' pivoted lever, one end of the lever adapted to contact the pilot valve, the opposite end of the lever being apertured and having the depending reciprocating core of a solenoid loosely threaded therethrough, a pivoted catch for engaging and suspending the apertured end of the lever, and a finger pivoted to the core adjacent its lower end for alternately releasing and engaging the lever and catch.

11. The combination with a main valve having a movable element provided with a piston, of a pilot valve to permit opening of the main valve by releasing pressure at one side of the piston, a presssure control device for automatically operating the pilot valve, and means for manually actuating the pilot valve independently of the pressure control device comprising a pivoted lever, one end of the lever adapted to contact the pilot valve, the opposite end of the lever being apertured and having the depending reciprocating core of a solenoid loosely threaded therethrough, a pivoted catch for engaging and suspending the apertured end of the lever, the lower end of the core slidingly fitting within a guide cup, and a trip finger pivoted to the core for alternately releasing and engaging the lever and catch, the said finger being adapted to swing to opposite sides of the core sufficiently to contact the upper edge of the guide cup upon each descent of the core.

In testimony whereof, I sign my name.

EDWARD V. ANDERSON.

Witnesses:
J. CLARK RIGGS,
BESSIE M. THAYER.